United States Patent [19]
Schaefer et al.

[11] Patent Number: 6,139,351
[45] Date of Patent: Oct. 31, 2000

[54] HIGH POWER CONNECTION SYSTEM

[75] Inventors: Christopher E. Schaefer, Warren, Ohio; Robert C. Beer, Noblesville, Ind.; Mark D. McCall, Youngstown, Ohio

[73] Assignee: Delphi Technologies, Inc., Troy, Mich.

[21] Appl. No.: 09/438,867

[22] Filed: Nov. 12, 1999

Related U.S. Application Data

[63] Continuation-in-part of application No. 09/332,606, Jun. 16, 1999, abandoned.

[51] Int. Cl.[7] ..................................................... H01R 13/62
[52] U.S. Cl. ....................... 439/372; 439/924.1; 439/857; 439/884
[58] Field of Search ..................................... 439/372, 557, 439/884, 842, 686, 488, 924.1

[56] References Cited

U.S. PATENT DOCUMENTS

| | | | |
|---|---|---|---|
| 4,845,589 | 7/1989 | Weidler et al. | 439/857 |
| 4,877,409 | 10/1989 | Tanigawa et al. | 439/857 |
| 5,024,627 | 6/1991 | Bennett et al. | 439/857 |
| 5,106,320 | 4/1992 | Kinnear | 439/295 |

*Primary Examiner*—Hien Vu
*Attorney, Agent, or Firm*—Richard A. Jones

[57] ABSTRACT

A high power connection system adapted for automotive environments which provides environmental and EMI shielding includes a female connector, a male connector, and a panel mount. The female connector includes a female connector base and a snap fitted female connector cover. The male connector includes a male connector base and a snap fitted male connector cover. The female connector base has at least one female power terminal cavity for seatably receiving a respective female power terminal. The male connector base has at least one male power terminal cavity for seatably receiving a respective male power terminal. The female connector is covered by a cover seal and a conductive shroud. A pair of lock arms protrude outward from the front end of the male connector base, pass through the panel mount and interface with a lever of a lever rotatably connected to the shroud to thereby mechanically assist mating of the male and female connectors. Safety terminals in the male and female connectors provide a last-to-connect-first-to-break connection with an HVIL circuit.

12 Claims, 9 Drawing Sheets

HIGH POWER CONNECTION SYSTEM

The present application is a continuation-in-part application of U.S. Ser. No. 09/332,606 filed on Jun. 16, 1999 which is now abandoned.

The Government of the United States of America has rights in this invention pursuant to Subcontract No. ZCB-3-13032-01 under Prime Contract No. DE-AC36-83CH10093 awarded by the U.S. Department of Energy.

TECHNICAL FIELD

The present invention relates generally to electrical connectors and more specifically to a high power connection system that is suitable for automotive environments and is capable of handling electrical currents in excess of 100 amperes (amps), either alternating current (AC) or direct current (DC).

BACKGROUND OF THE INVENTION

A problem frequently encountered in automotive electronics is a lack of power connection systems which are capable of handling in excess of 100 amps. Prior art connection systems which do have the required current carrying capacity are extremely expensive, bulky and were not designed for an automotive environment. Most of these connectors are for military applications, have too many parts, lack self-contained safety features, and are expensive and/or difficult to assemble.

With the advent of hybrid electric vehicles, there is now a need for an electrical power connection system which is configured for an automotive environment and able to handle large power loads.

Accordingly, there is a clearly felt need in the art for a high power connection system for automotive environments which handles electrical currents in excess of 100 amps, has a reduced number of parts, may be easily assembled, and has built-in safety features.

SUMMARY OF THE INVENTION

The present invention is a high power connection system which handles electrical currents in excess of 100 amps, has a reduced number of parts, may be easily assembled without resort of fasteners, has built-in safety features, is environmentally sealed and prevents electromagnetic interference (EMI) leakage.

The high power connection system according to the present invention includes a female connector, a male connector, and a panel mount. The female connector includes a female connector base and a snap fitted female connector cover. The male connector includes a male connector base and a snap fitted male connector cover. The female connector base has at least one female power terminal cavity for seatably receiving a respective female power terminal. The male connector base has at least one male power terminal cavity for seatably receiving a respective male power terminal. A pair of lock arms protrude outward from the front end of the male connector base.

The male connector is preferably composed of a glass-filled plastic and is preferably integrated directly into a subsystem (ie, motor, transmission, propulsion system, etc.) via the panel mount, which is preferably composed of an aluminum based material. In this regard, the lock arms are inserted into one side of the panel mount, wherein the lock arms pass through respective slots in the panel mount, are sealed thereto by silicone seals, and are affixed thereto by abutment of resilient locking fingers. The panel mount, in turn, is connected to the housing of the subassembly. The female connector is preferably composed of glass-filled plastic and performs the functions of shielding, sealing and protecting the male connector; while both the male and female connectors provide high power electrical connection when mated (engaged) to each other. Although a preferred form of the male and female connectors (shown in the appended drawings) is a five-way electrical connection system, having cavities for three power terminals and two safety terminals, the connection system may utilize a different number of terminal cavities (as for example two power terminals and two safety terminals), per a particular application.

The connection system utilizes built-in safety features, in particular high voltage interlock loop (HVIL) circuits which are routed through the safety terminal cavities and are used to detect an impending disconnect and, in response thereto, signal a shutdown of the electrical system interfaced with the male and female power terminals prior to their actual separation. HVIL circuits are known in the art, and are generally utilized with high current carrying connection systems. In the present HVIL circuit, the male and corresponding female safety terminals are structured to disconnect prior to disconnection of the male and female power terminals.

The male power terminal is composed of silver plated copper and is characterized by a pair of projecting contact blades. The male connector base allows for the male power terminal (pre-crimped to a power cable) to be mated easily, thus reducing the labor time. Prior to the male connector cover mating to the male connector base, the male power terminal is kept in place by a terminal lock post. Once the male power terminals are seated inside the male connector base, the male connector cover snappably seats itself directly onto the male connector base and locks the male power terminal in place. The male connector also contains two safety terminal cavities for each receiving a male safety terminal which interface with female safety terminals on the female connector. The safety terminals are connected to the HVIL circuits and act as a safety device against shock, arcing or other calamity as may result from an untoward disconnection event during high power operation of the electrical connection system. The male and female power terminals are retained fully in the connection system once the male and female connectors are mutually mated (engaged).

The lock arms provide mechanical features that enable the use of a force multiplying mechanical lock assist mechanism to mate the male connector to the female connector. Alignment tabs on the male connector are designed to provide indexable alignment to the subassembly housing opening, provide stability to the male connector during shipment, and provide alignment to mating with the female connector. Additionally, the alignment tabs provide physical protection for the protruding contact blades of the male power terminals.

The female power terminal is composed of silver plated copper and is characterized by a general S-shape forming a pair of blade receiving seats for the contact blades of the male power terminal. The female connector base allows for the female power terminal (pre-crimped to a power cable) to be simply seated into the corresponding female power terminal cavities. Once the female power terminals are seated, the female connector cover can then be pressed on, preventing the female power terminals from backing out. A nosepiece of the female connector base provides a significant amount of lead-in for the male power terminal contact blades while preventing the female power terminals from pushing forward. The nose may be either snap fitted to the forward end of the female connector base or be integrally formed therewith. The female connector also has a pair of safety terminal cavities for each receiving a respective female safety terminal, as mentioned hereinabove for interfacing with the male safety terminals and the HVIL circuits.

Once the female connector is fully assembled, a seal cover, preferably composed of silicone overmolded plastic, is then seated thereover. The seal cover prevents environmental damage to the connection system, wherein the seal cover restricts the possible leak paths to the connector body to only two places (around the power cable and around the front face where the seal cover is placed in compression via the mechanical assist mechanism); the seal cover further provides strain relief to the power cables emanating from the female connector. A shroud, preferably composed of aluminum, is then fitted over the seal cover. The shroud prevents EMI from leaking by virtue of its inherent conductivity, and carries a conductive seal ring (preferably formed of a conductive silicone) for grounding the panel mount to braided shielding grooves thereof.

The shroud is the primary means of attaching a pivotal lever portion of the mechanical assist mechanism to the female connector. The female connector is mated to the male connector by way of a pair of eccentric slots of the lever grabbing hold of bosses of the male connector lock arms. Rotation of the lever (preferably composed of aluminum) then pulls the female connector matably into the male connector, whereupon the male and female power terminals and the male and female safety terminals are respectively connected together (the safety terminals being last to connect, first to disconnect) and the female connector is sealed with respect to the panel mount; finally the lever locks in place.

Advantageous features of the connection system according to the present invention, include the following:

- the male connector can be easily seated within the housing of the subassembly (ie., motor, transmission, propulsion system, etc.), thus reducing parts and over-all installation labor for the connection system;
- the connection system does not utilize any fasteners to achieve mating, thereby saving time, casing assembly, and reducing the overall labor burden, all of which contributing to facilitating an automotive style of assembly, wherein the non-fastener mating (engagement) is a result of the ability of the male connector to be held in place via the lock arms, which further allow the female connector to grab onto and pull itself to seal;
- the connection system can be utilized at currents in excess of 100 amps continuous (ie., 230 amps continuous), utilizes HVIL circuits integrated into the male and female connectors which act as a safety device providing break-first-mate-last safety features, and offers overall high density, high current, low cost, and the capability of accommodating power cables up to 1 gauge;
- the connection system retains the power terminals via a unique "clamshell" design that does not require push-to-seat or pull-to-seal, wherein the clamshell lends itself to positively locating the power terminals before the base and cover halves can be snapped together to lock in the power terminals; and
- the shroud on the female connector prevents EMI from leaking out as well as prevents water or environmental intrusion into the subassembly, and the connection system once fully assembled is completely shielded and environmentally sound.

Accordingly, it is an object of the present invention to provide a high power connection system which handles more power than that of prior art automotive connectors.

It is a further object of the present invention to provide a high power connection system which has fewer parts than connection systems with similar power handling capacity.

It is yet a further object of the present invention to provide a high power connection system which has self-contained safety features.

It is yet another object of the present invention to provide a high power connection system which is cost effective.

It is still another object of the present invention to provide a high power connection system which provides environmental sealing and prevents EMI leakage.

It is an additional object of the present invention to provide a high power connection system which may be easily assembled without resort to fasteners and is aided by a mechanical assist mechanism.

These and additional objects, advantages, features and benefits of the present invention will become apparent from the following specification.

BRIEF DESCRIPTION OF THE DRAWINGS

FIG. 3A is a partly sectional side view showing placement in the male connector of a male safety terminal in accordance with the present invention.

DESCRIPTION OF THE PREFERRED EMBODIMENT

Figure 1:
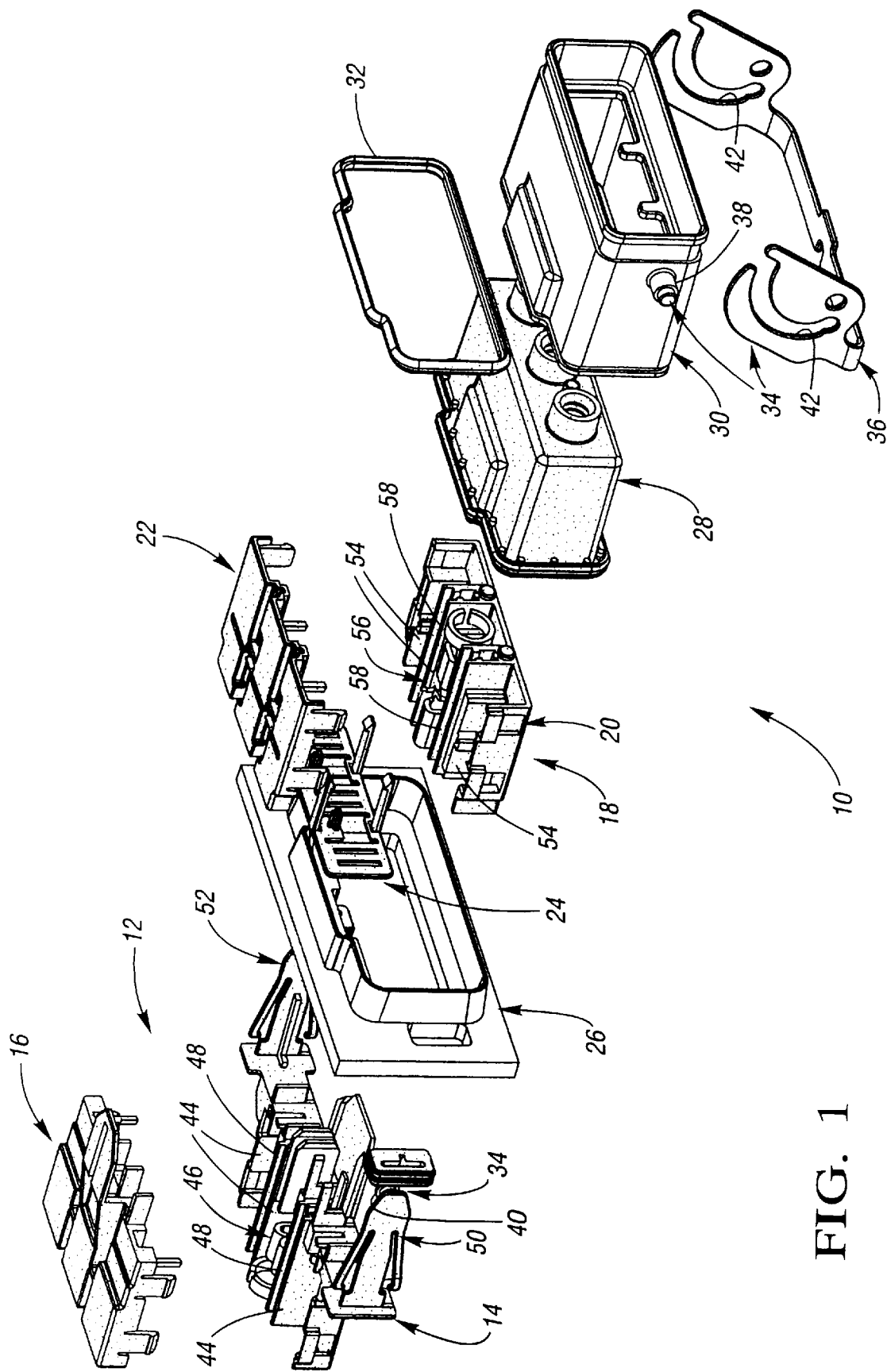
FIG. 1 is a partially exploded perspective view of a high power connection system in accordance with the present invention.
Figure 2:
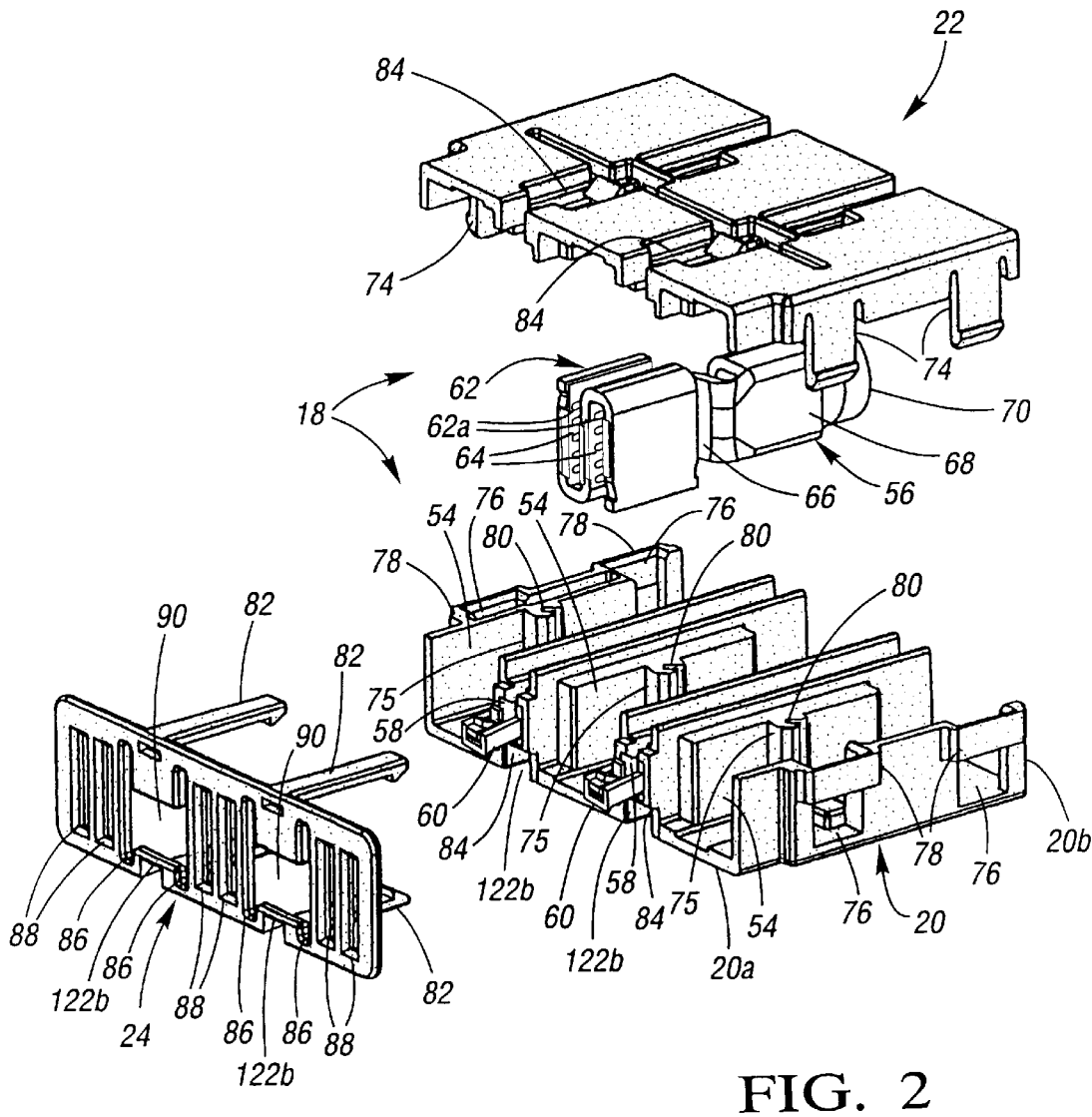
FIG. 2 is an exploded perspective view of a female connector in accordance with the present invention.
Figure 2A:
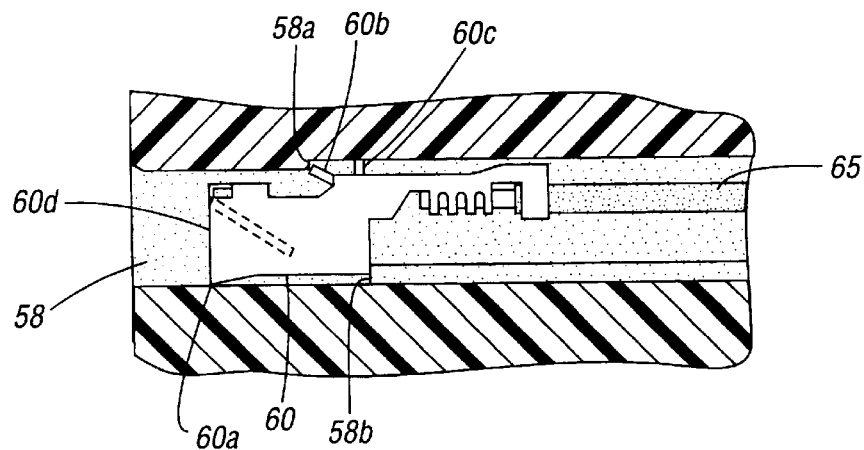
FIG. 2A is a partly sectional side view showing placement in the female connector of a female safety terminal in accordance with the present invention.

Referring now to the Drawings, FIG. 1 depicts an exploded view of the connection system 10 according to the present invention. The connection system 10 generally includes a male connector 12 having a male connector base 14 and a snap fitting male connector cover 16; a female connector 18 having a female connector base 20, a snap fitting female connector cover 22, and a nose 24; a panel mount 26; a seal cover 28 for receiving therein the female connector; a conductive shroud 30 for receiving the cover; a conductive seal ring 32; and a mechanical assist mechanism 34 composed of a lever 36 rotatably mounted to pivots 38 on the conductive shroud 30 and a pair of bosses 40 mounted to the male connector base which interface with eccentric slots 42 of the lever.

The male connector base 14 has at least one male power terminal cavity 44 (preferably three) for seatably receiving a respective male power terminal 46. A pair of male safety terminal cavities 48 are also provided for each carrying a male safety terminal, as will be discussed hereinbelow. A pair of lock arms 50, 52 protrude outward from the front end of the male connector base, each carrying an aforementioned boss 40.

The female connector base 20 has at least one female power terminal cavity 54 (preferably three) for seatably receiving a respective female power terminal 56. The nose 24 is shown in FIG. 1 snappably connectable to the front end of the female connector base 20; however, in an alternative preferred embodiment of the female connector base (see FIGS. 6 and 7), the nose may be integrally formed therewith. A pair of female safety terminal cavities 58 are also provided for each carrying a female safety terminal, as will be discussed hereinbelow.

Referring now to FIGS. 2, 2A, and 5 through 7, the female connector will be detailed with greater particularity.

The female connector 18 is preferably composed of a glass-filled plastic. Each female terminal cavity 54 of the female connector base 20 extends between the forward and rearward ends 20a, 20b thereof, and has received therein a female power terminal 56. Each female safety terminal cavity 58 also extends between the forward and rearward ends 20a, 20b and has received therein a female safety terminal 60.

The female power terminals 56 are composed of silver plated copper and are characterized by a general S-shape female contact 62 which forms a pair of blade receiving seats 64 for contactably receiving the contact blades of a male power terminal (discussed hereinbelow). The female power terminal 56 includes a curved stem 66 which connects the female contact 62 with a wire crimp member 68 and an insulation crimp member 70. A louvered insert 62a, preferably composed of silver plated beryllium copper, is present in each of the blade receiving seats 64. The louvers of the louvered insert 62a provide an assured, snug, and electrically good contact with the contact blades of the male power terminal when these are inserted into the blade receiving seats 64.

The female connector base 20 allows each female power terminal 56, pre-crimped to a power cable 72 (see FIG. 13), to be simply seated into the respective corresponding female power terminal cavities 54. An abutment 75 is disposed inside each female power terminal cavity 54, which is sized and located to be received by the curved stem 66 so as to prevent the female power terminal from being pulled out the rearward end 20b of the female connector base 20.

Each female safety terminal 60 is secured in its respective female safety terminal cavity 58. By way of preferred example shown at FIG. 2A, the female safety terminals are Delphi Automotive Systems 280 Series, P2S female terminals having a U-shape characterized by an upturned forward end 60a, a pair of depending tangs 60b, 60c and a contact tang 60d. The female safety terminal is locked into the female terminal cavity 58 between an upper abutment 58a and a lower abutment 58b. Each female safety terminal 60 is conventionally connected to a respective wire 65 of a conventional HVIL circuit.

The female connector cover 22 has a plurality of barbed locking tabs 74 projecting therefrom. Each locking tab 74 is interfaced with a respective locking slot 76 disposed in the sides of the female connector base 20 such that they provide clearance for the plurality of locking tabs 74 as the barbs pass beyond a locking strap 78. Once therepast, the locking strap 78 is engaged by the barbs as the locking straps resiliently relax, and thereby the female connector cover is locked to the female connector base. In this regard, is preferable that guide posts 85 (see FIG. 6) project from the female connector base to be received by guide holes 80 at the abutments 75.

The nose 24 has a plurality of locking tongues 82 extending outward from the top and bottom thereof for being clippably received by a respective locking recess 84 of the female connector base and cover 20, 22. The nose 24 is provided with a plurality of alignment slots 86 and a plurality of contact blade slots 88, the nature of which will become clear shortly. The nose 24 further is provided with a pair of female safety terminal openings 90 which are aligned respectively with the female terminal cavities 58 when the nose is fitted onto the female connector base 20. The nose 24 serves as a lead-in or guide for each of the projecting contact blades 92, whereas, if two connection systems were used, the nose 24 may also provide indexing. The nose 24 further serves a safety function by preventing electrical shock from inadvertent contact with a "hot" female power terminal 56.

Figure 5:
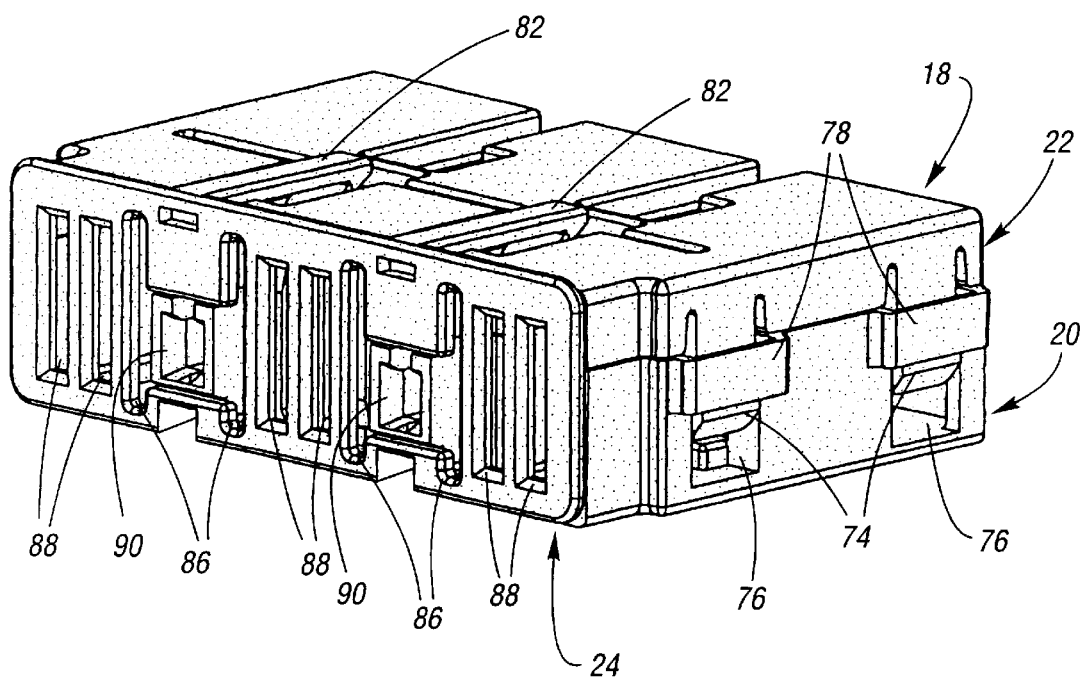
FIG. 5 is a perspective view of an assembled first preferred form of the female connector in accordance with the present invention.
Figure 6:
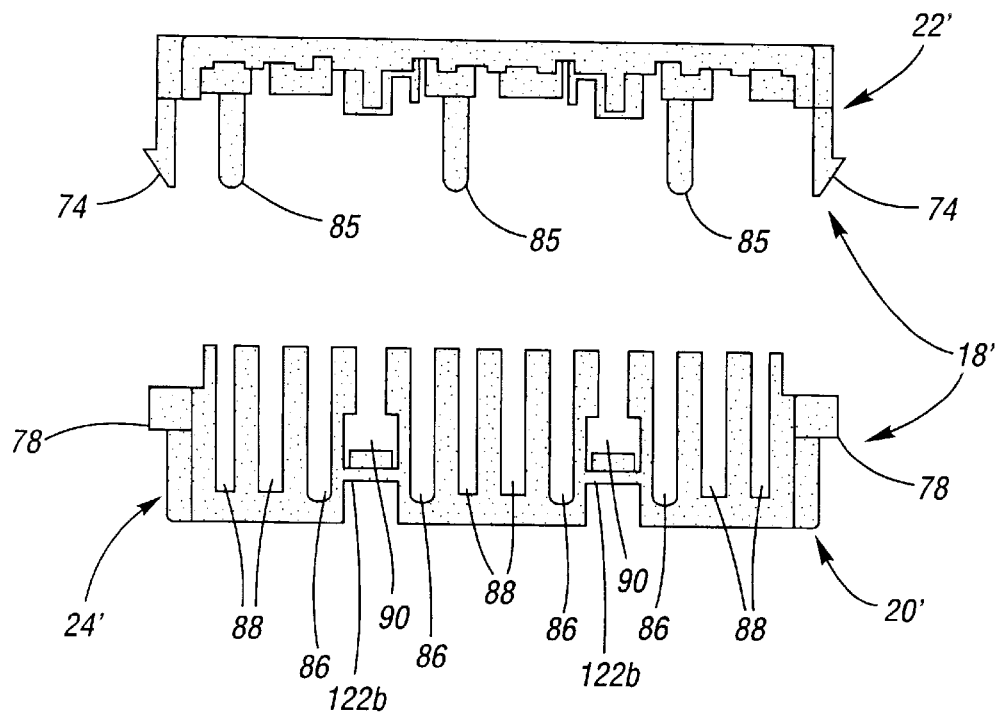
FIG. 6 is an exploded front view of a second preferred form of the female connector in accordance with the present invention.
Figure 7:
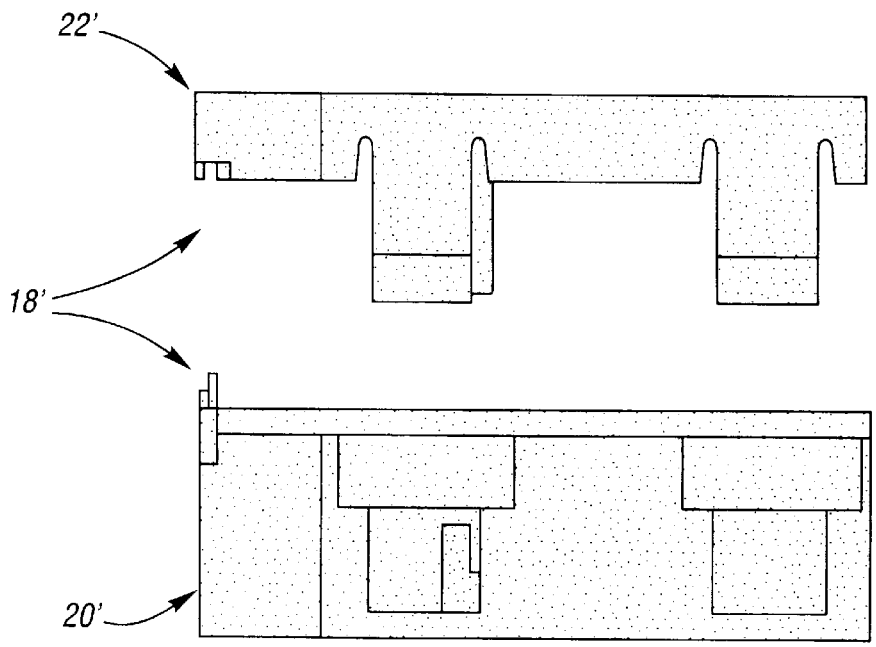
FIG. 7 is an exploded side view of the second preferred form of the female connector in accordance with the present invention.

FIG. 5 shows an assembled female connector 18, where the nose 24 is snappably connected to the female connector base. FIGS. 6 and 7 show an alternative female connector 18' having a female connector base 20' and female connector cover 22' snapped thereon, wherein the nose 24' is integrally formed with the female connector base. The former (FIG. 5) has the advantage that the nose may be easily replaced or customized, whereas the latter (FIGS. 6 and 7) provides simplification of assembly. In either case, the nose 24, 24' provides a significant amount of lead-in for the male power terminal contact blades (see below) while preventing the female power terminals 56 from pushing forward.

Figure 3:
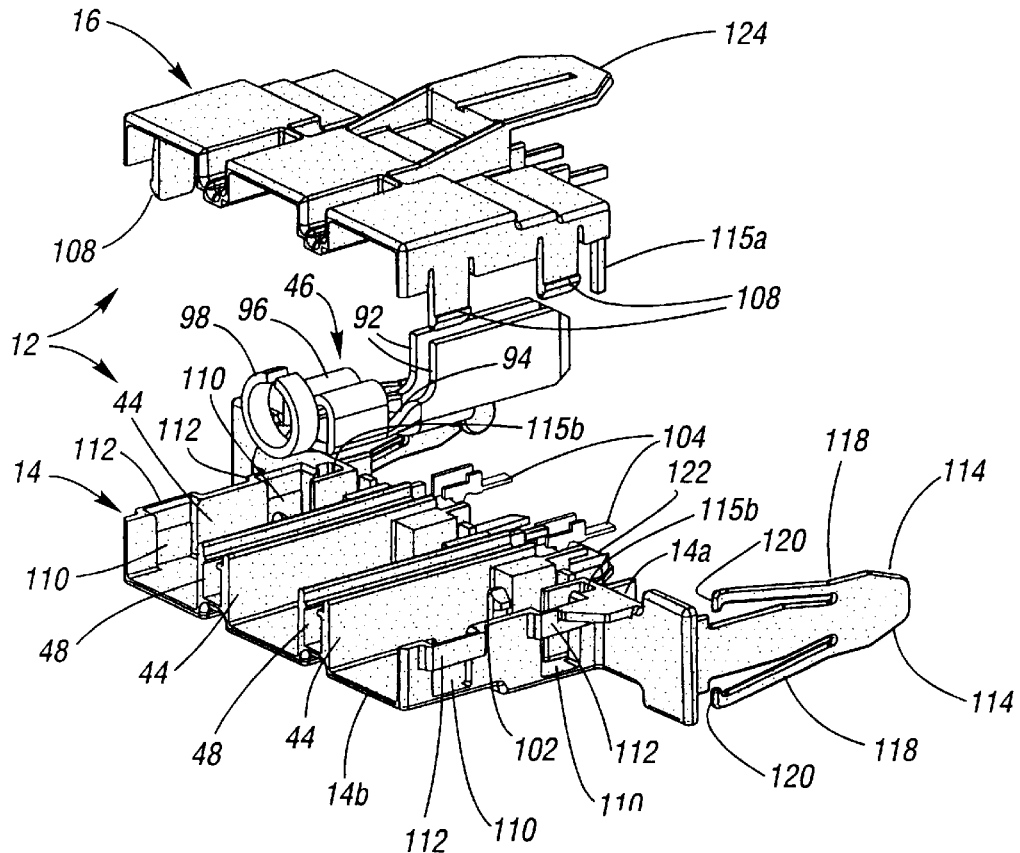
FIG. 3 is an exploded perspective view of a male connector in accordance with the present invention.
Figure 4:
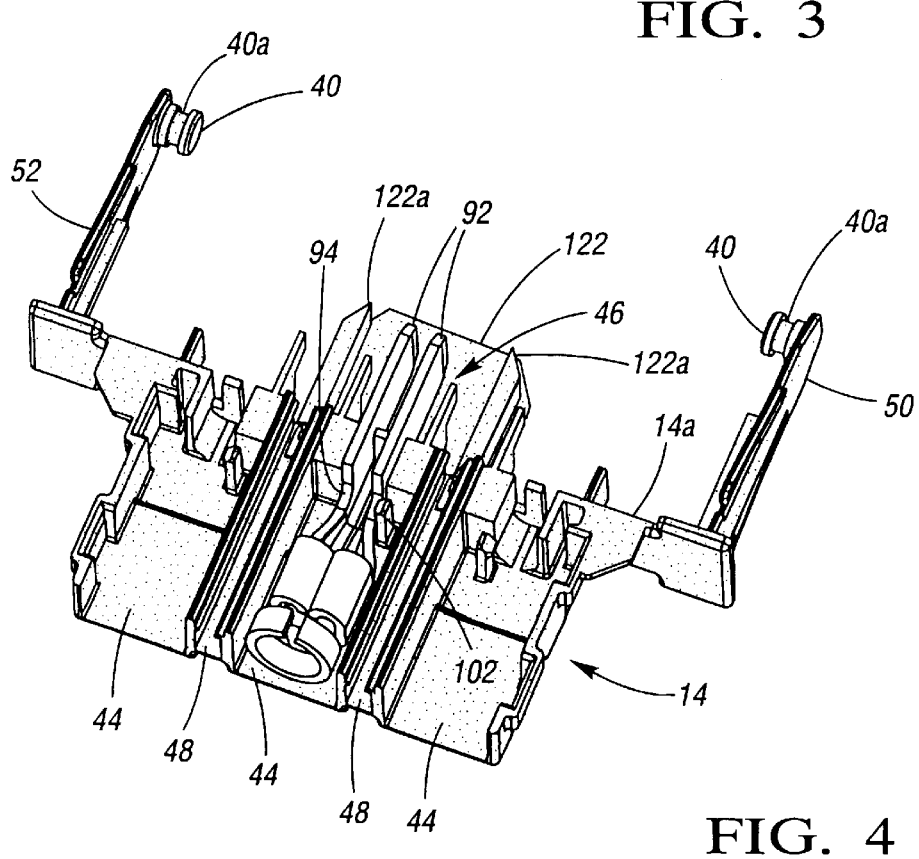
FIG. 4 is a perspective view of a male connector base in accordance with the present invention.
Figure 3:
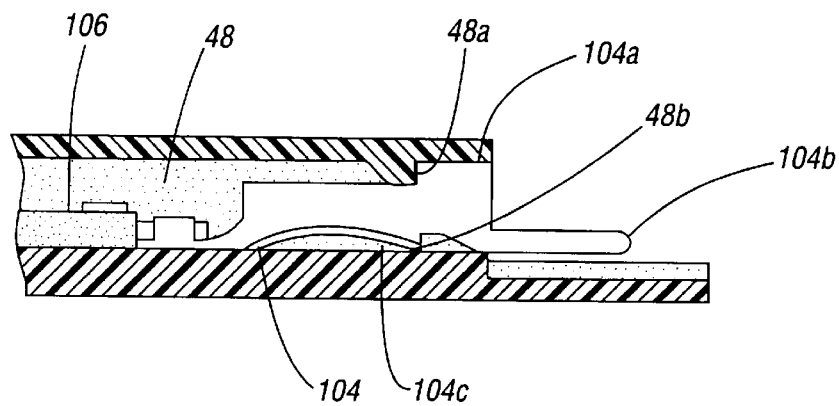

Referring now to FIGS. 3 through 4, the male connector 12 will be detailed with greater particularity.

The male connector 12 is preferably composed of a glass-filled plastic and is preferably integrated directly into a subsystem (not shown, but generally constituting any housed electrically operated mechanism such as a motor, transmission, propulsion system, etc.) via the panel mount 26, which will be discussed hereinbelow.

The male power terminal 46 is composed of silver plated copper and is characterized by a pair of projecting contact blades 92, each of which being contactably receivable into a respective blade receiving seat 64 of a respective female power terminal 56. The male power terminal 46 includes a notched stem 94 which connects the contact blades 92 with a wire crimp member 96 and an insulation crimp member 98.

The male connector base 14 allows for the male power terminal 46 (pre-crimped to a power cable 100) to be seated easily in its male power terminal cavity 44, which extend from a forward end 14a to a rearward end 14b of the male connector base. Prior to the male connector cover 16 being snappably mated to the male connector base 14, each male power terminal 46 is kept in place by a resilient terminal lock post 102 which has a barb that engages the notched stem 94 (see FIG. 13).

Each male safety terminal 104 is secured in its respective male safety terminal cavity 48 which extends from the forward to the rearward ends 14a, 14b of the male connector base 14. By way of preferred example shown at FIG. 3A, the male safety terminals are Delphi Automotive Systems 280 Series, P2S male terminals having a U-shape characterized by an upstanding flange 104a, a projecting contact 104b, and a depending tang 104c. The male safety terminal 104 is locked into the male safety terminal cavity 48 between an upper abutment 48a and a lower abutment 48b. Each male safety terminal 104 is conventionally connected to a respective wire 106 of a conventional HVIL circuit.

Figure 8:
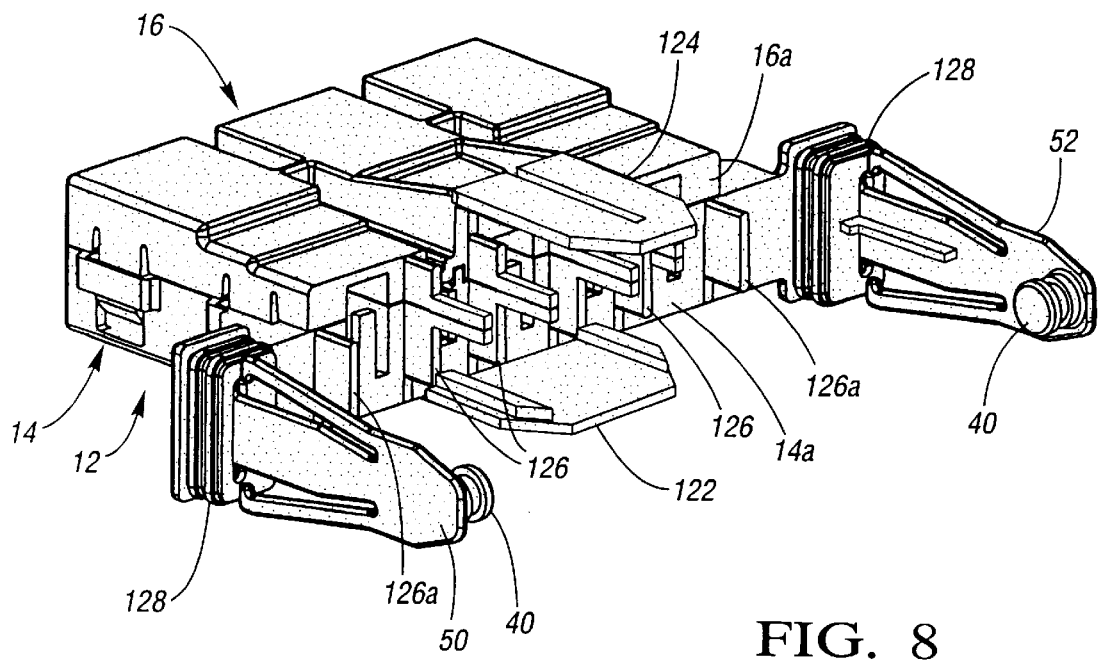
FIG. 8 is a perspective view of an assembled male connector with mount seals attached thereto in accordance with the present invention.

Once the male power terminals and the male safety terminals are seated inside the male connector base 14, the male connector cover 16 snappably seats itself directly onto the male connector base and locks the male power terminals in place. The male connector cover 16 has a pair of guide posts 115a that are received by guide holes 115b. A plurality of barbed locking tabs 108 protrude from the male connector cover 16. Each locking tab 108 is disposed into a respective locking slot 110 located on the sides of the male connector base 14. During insertion, the barbs pass a respective locking strap 112 disposed across the top of each locking slot 110, whereupon the locking tabs 108 resiliently relax and the barbs are engaged upon the locking straps thereby locking the male connector cover 16 to the male connector base 14. FIG. 8 shows an assembled male connector 12.

As can be best seen at FIG. 4, the lock arms 50, 52 extend outward from the forward end 14a of the male connector base 14. The front end of each lock arm 50, 52 has a chamfer 114 (see FIG. 3) to facilitate insertion into a pair of arm openings 116 formed in the panel mount 26 (see FIG. 9). A pair of resilient locking fingers 118 are disposed at substantially the front end of each lock arm 50, 52, each having a foot 120 (see FIG. 3) disposed remote from the front end. A pair of mutually inward facing bosses 40 are formed on each of the lock arms 50, 52 adjacent the front end thereof. Each boss 40 has an annular groove 40a.

A base alignment tab 122 is disposed at the forward end 14a of the male connector base 14, and a cover alignment tab 124 is disposed at the forward end 16a of the male connector cover 16, each being chamfered. The base alignment tab 122 has ribs 122a which interact with slots 122b at the female connector base (however, the ribs 122a and the slots 122b may be omitted in certain embodiments, particularly if the nose is snappably fitted to the female connector base), besides being wider than the cover alignment tab 124, to prevent the male connector 12 from being inserted into the female connector 18 upside down. The base and cover alignment tabs extend beyond the contact blades 92 to render high stability to the mating of the male and female connectors and to serve as some protection for the contact blades. A plurality of alignment pillars 126 are provided on the forward ends of the male connector cover and male connector base (see FIG. 8) for guiding engagement with the alignment slots of the nose 24, 24'. The alignment tabs 122, 124 alignment pillars 126 and auxiliary alignment pillars 126a (which engage either side of the female connector base) serve to align and index mating of the male connector 12 to the female connector 18, while additionally providing anti-rotation therebetween.

Figure 9:
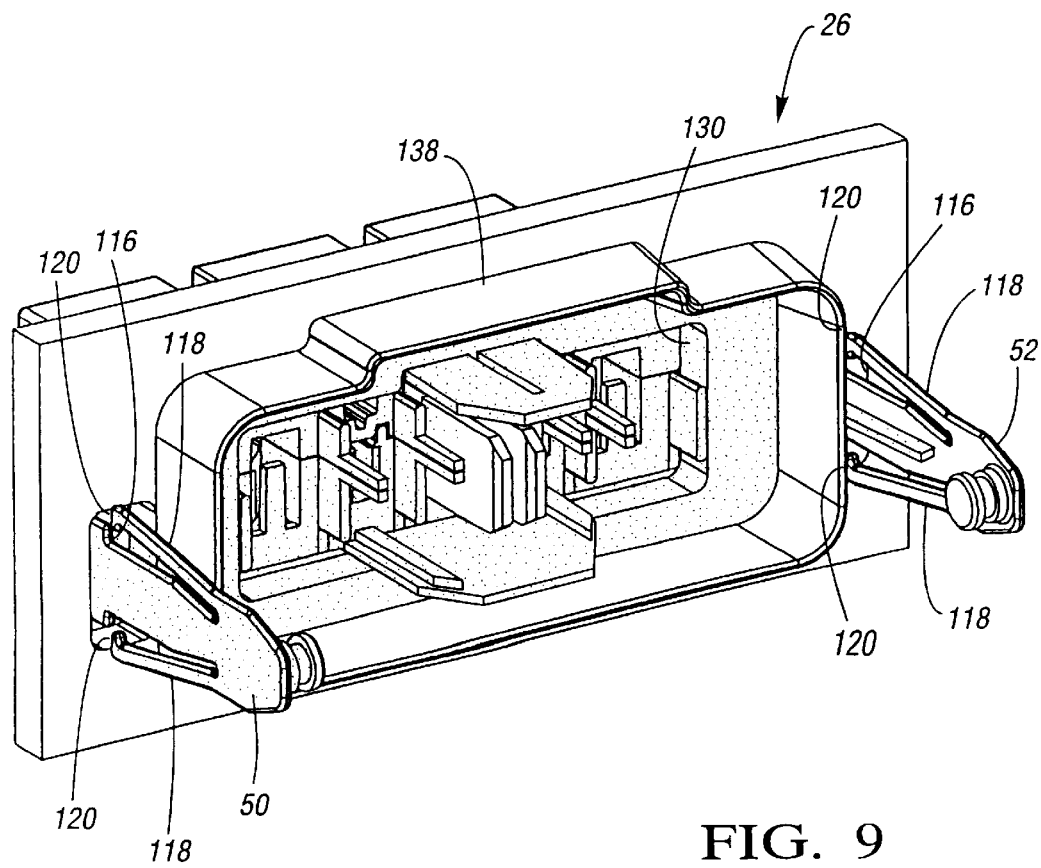
FIG. 9 is a perspective view of the assembled male connector attached to a panel mount in accordance with the present invention.

FIG. 9 shows the male connector 12 attached to the panel mount 26. With the lock arms 50, 52 of the male connector 12 equipped with (durometer silicone) arm seals 128, as shown at FIG. 8, the male connector is mated to the panel mount 26. The lock arms 50, 52 are passed through the arm openings 116 from an interior side of the panel mount until the feet 120 of the resilient fingers 118 resiliently relax onto an exterior side of the panel mount, as shown at FIG. 9. Now, the male connector 12 is locked onto the panel mount 26, and the central opening 130 thereof exposes the forward ends 14a, 16a of the male connector base 14 and the male connector cover 16. The arm seals 128 prevent moisture from weeping through the arm openings 116 of the panel mount 26.

Figure 10:
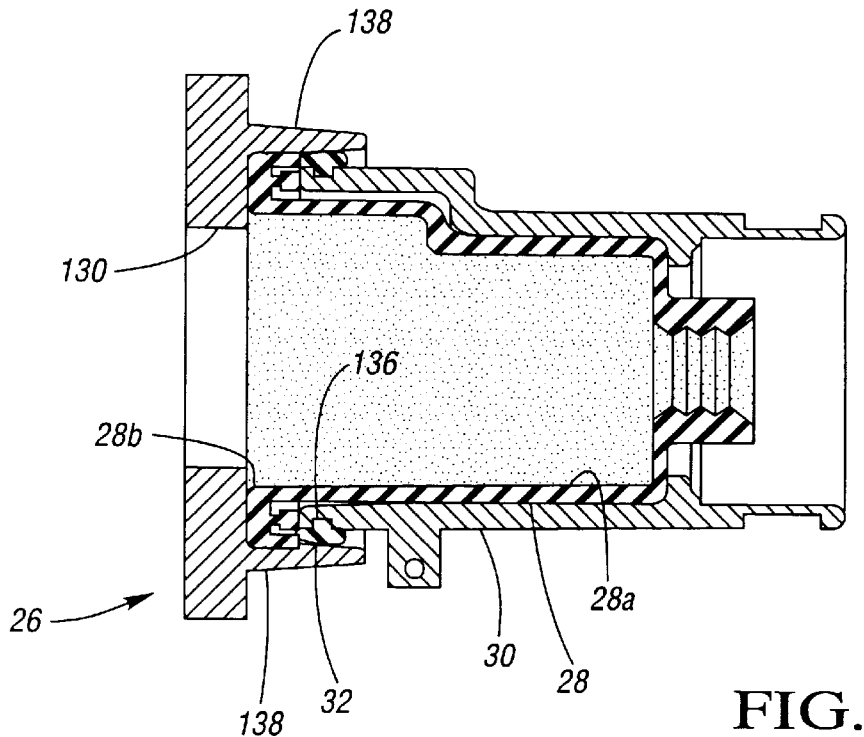
FIG. 10 is a cross-sectional view of the female connector in accordance with the present invention.

Once the female connector 18 is fully assembled, the seal cover 28, preferably composed of silicone overmolded plastic, is then seated thereover. By way of preferred example, 85% of the seal cover is over molded silicone, while the remaining plastic component provides structural stability. As shown in FIG. 10, the seal cover 28 is configured to have an internal surface 28a that conformably receives the female connector 18 through a mouth 28b thereof. The seal cover 28 also includes seals for any electrical wiring emanating from the female connector (a cable seal 132 for each power cable emanating from the female connector and a wire seal 134 for each safety wire emanating from the female connector, see FIG. 12). The seal cover 28 prevents environmental damage to the connection system as well as strain relief to the power cables and safety wires emanating from the female connector, wherein the seal cover restricts the possible leak paths to the connector body to only two places (around the power cable and around the front face where the seal cover is placed in compression via the mechanical assist mechanism).

Next, after the female connector 18 is seated into the seal cover 28, the shroud 30, preferably composed of aluminum, is then be fitted over the seal cover. The shroud 30 prevents EMI from leaking by virtue of its inherent conductivity, and carries in a groove 136 thereof the above mentioned conductive seal ring 32, which is preferably composed of a conductive silicone. The conductive seal ring 32 provides electrical grounding between a lip 138 of the panel mount 26 (adjacent the central opening 130 thereof) to the (braided shielding) groove 136 of the shroud, as well as sealing therebetween. The shroud and the panel mount 26 provide shielding from EMI leaking out of the female connector 18.

Figure 11:
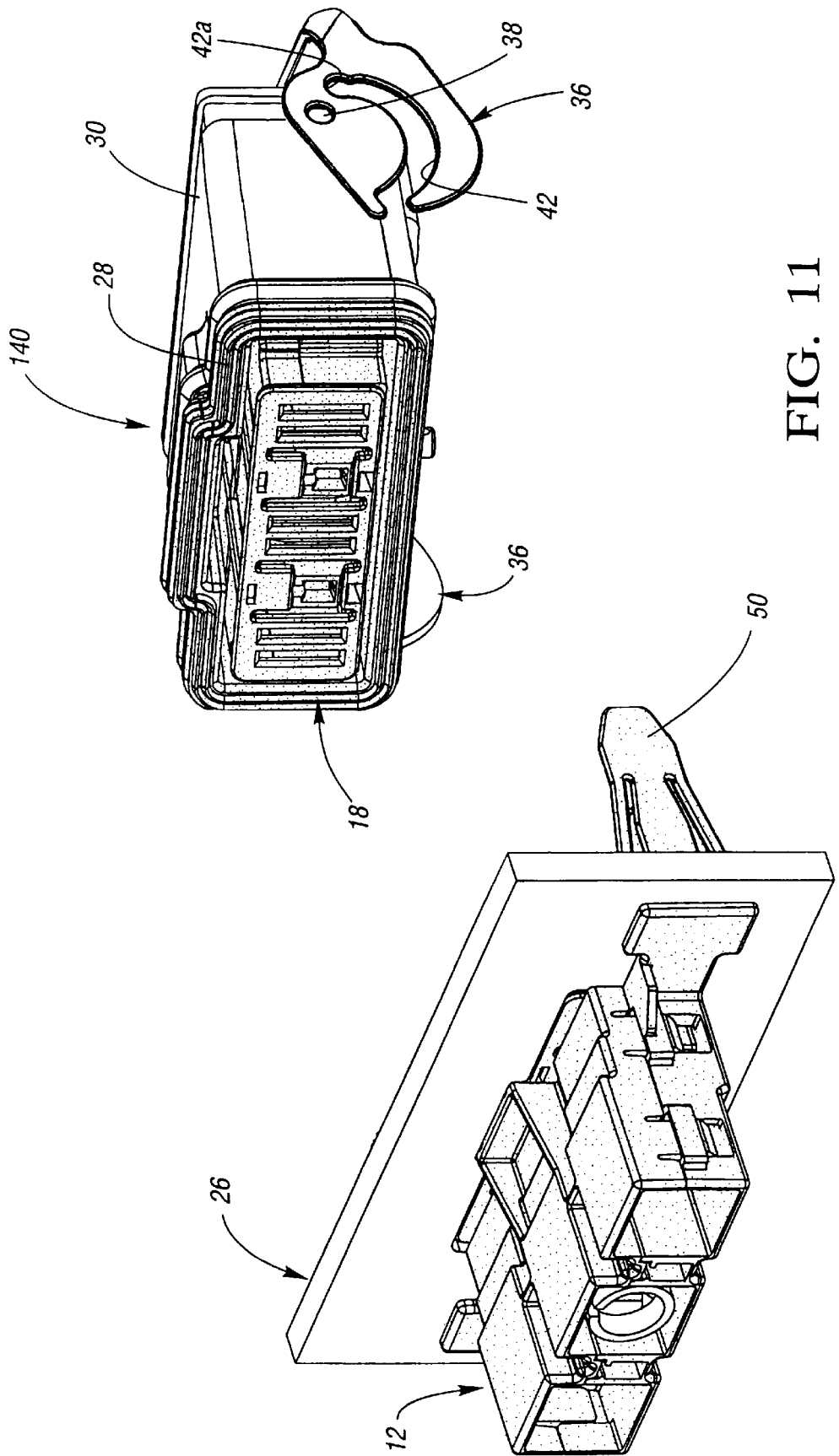
FIG. 11 is an exploded perspective view of the high power connection system in accordance with the present invention, seen prior to actuation of a mechanical assist mechanism.

The male connector 12 and the female connector assembly 140, which includes the female connector 18, the seal cover 28 and the shroud 30, are then brought into a mating relationship as generally shown at FIG. 11. Once the male and female connectors make initial contact, the mechanical assist mechanism 34 is used to secure full mating therebetween with little manual effort. The lever 36 (preferably composed of aluminum) is rotatably mounted on the pivots 38 of the shroud 30. The lever is oriented as shown at FIG.

11 so that the eccentric slot 42 has its opening facing the bosses 40 of the lock arms 50, 52. The eccentric slot 42 is then captured slidingly on the annular groove 40a of the bosses 40. Now, as the lever 36 is rotated on the pivots 38, the bosses 40 slide along the eccentric slots 42 causing the female connector 18 to be driven matingly into the male connector 12, whereupon the male and female power terminals 46, 56 are electrically connected, the male and female safety terminals 104, 60 are thereafter electrically connected, and the female connector assembly 140 is sealed with respect to the panel mount 26; the lever locks when the bosses 40 reach a pivot seat 42a of the eccentric slots 42, as shown at FIG. 12.

Figure 12:
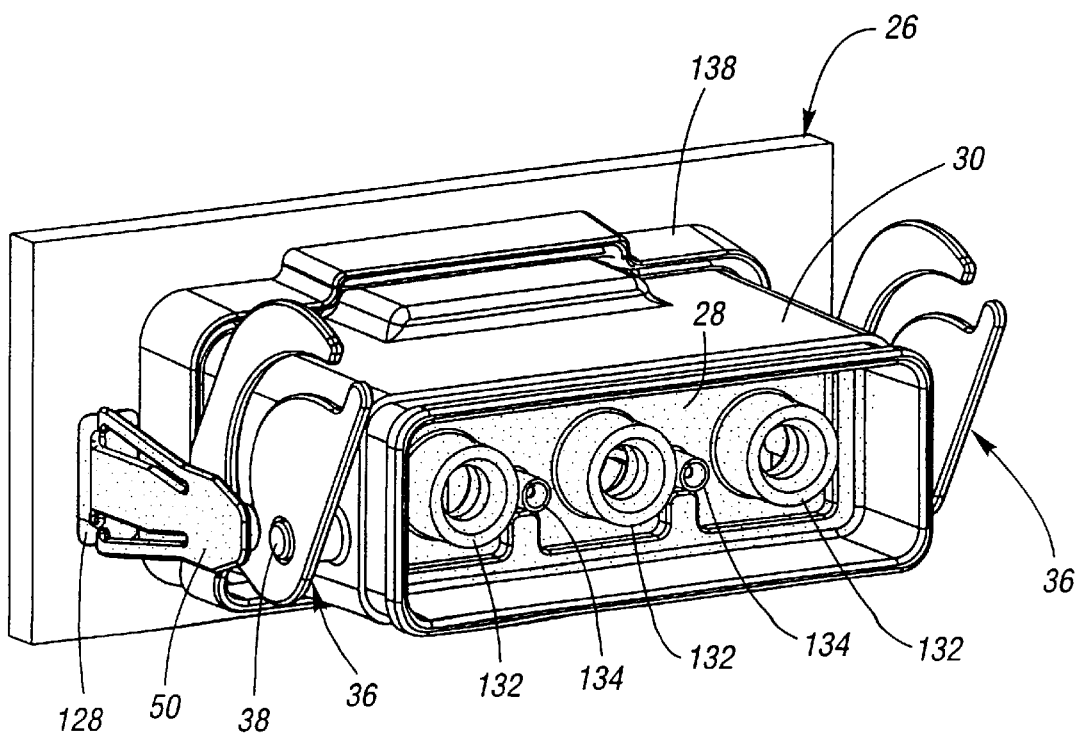
FIG. 12 is a perspective view of the high power connection system in accordance with the present invention, seen from the female connector side of the panel mount after actuation of the mechanical assist mechanism.
Figure 13:
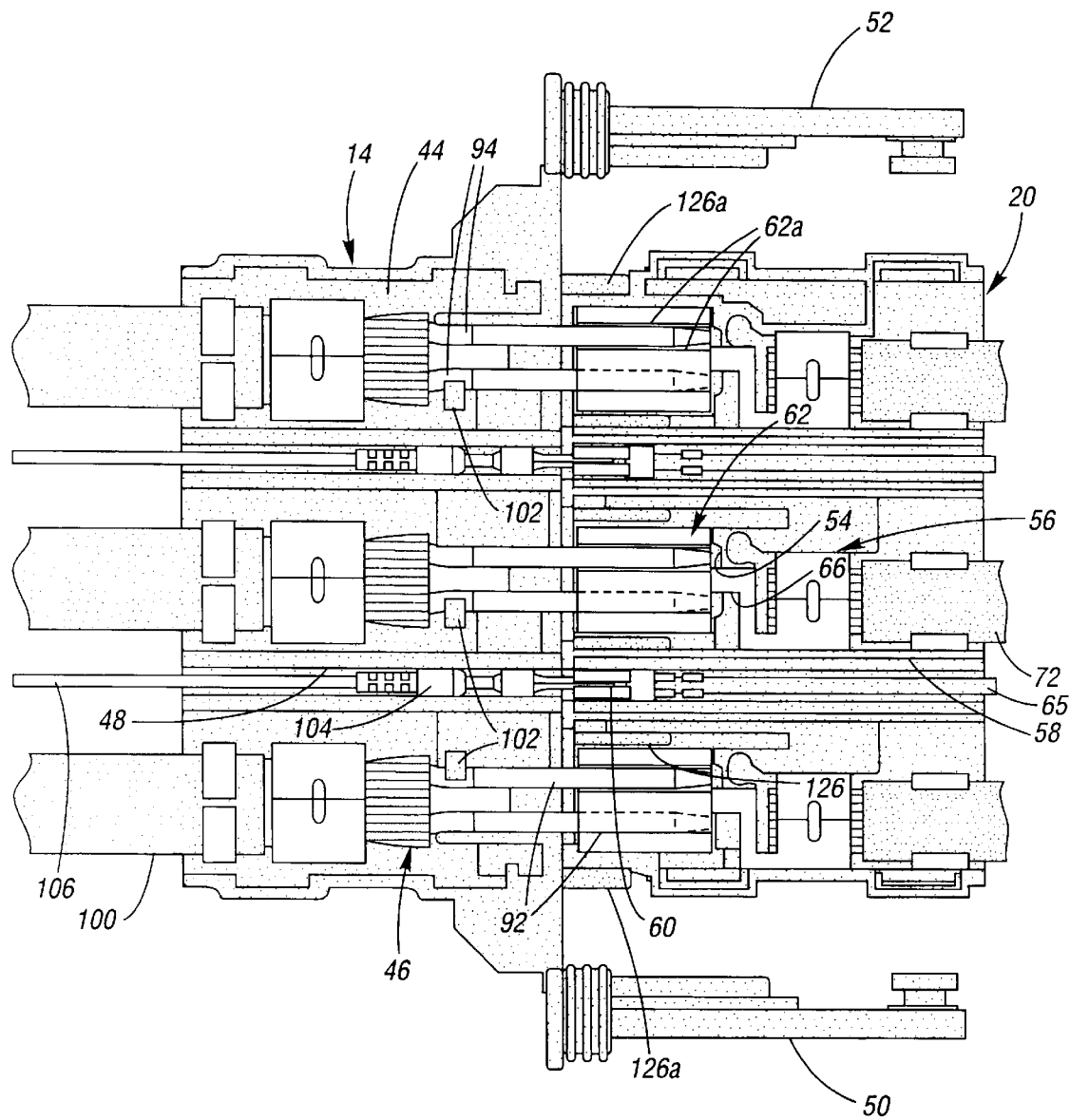
FIG. 13 is a plan view of the connection system in accordance with the present invention, wherein the base of the male and female connectors are shown mated and in mated operation with respect to the power and safety terminals carried thereby.

FIG. 13 is a view of the male connector base 14 mated to the female connector base 20 (the respective covers, the panel mount, the cover seal and the shroud being removed), showing the electrical connections when mating of the male and female connectors 12, 18 is provided as shown at FIG. 12.

The connection system utilizes built-in safety features, in particular high voltage interlock loop (HVIL) circuits which are routed through the safety terminal cavities and are used to detect a disconnect and, in response thereto, signal a shutdown of the electrical system interfaced with the power terminals. HVIL circuits are known in the art, and are generally utilized with high current carrying connection systems. In the present HVIL circuit, the male and corresponding female safety terminals are structured to disconnect prior to disconnection of the male and female power terminals, as for example because the length of the male safety terminal male contacts project from the forward end of the male connector base a distance less than that of the male power terminal contact blades, and the female safety terminals and female power terminals are commonly aligned with respect to the rearward end of the female connector base.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A high power connection system comprising:

at least one male power terminal comprising at least one contact blade and means for connecting a power cable thereto;

a male connector having a forward end, said male connector having at least one male power terminal cavity for receiving therein a respective male power terminal, wherein the at least one contact blade of the received male power terminal projects from said forward end of the male connector;

at least one female power terminal comprising a female contact having at least one blade seat for contactably receiving at least one contact blade of a respective male power terminal, and further comprising means for connecting a power cable thereto;

a female connector having a forward end, a nose frame being located at said forward end, said nose frame having a plurality of blade slots and a plurality of alignment slots, said female connector having at least one female power terminal cavity for receiving therein a respective female power terminal, wherein the female contact of the received female power terminal is located adjacent said forward end of said female connector, wherein said forward ends of said male and female connectors are configured to mutually mate such that the at least one contact blade of each male power terminal passes through a respective blade slot and seats into a respective blade seat of a respective female power terminal;

alignment tab means connected with said forward end of said male connector for alignably and indexably interfacing with the alignment slots of said nose frame when said male and female connectors are mutually mated; and safety terminal means located in each of said male and female connectors for providing an advance indication of a loss of electrical contact between said at least one male and female power terminals in response to said forward end of said male connector being separated a preselected distance from said forward end of said female connector.

2. The connection means of claim 1, wherein said at least one contact blade of each male power terminal comprises a pair of contact blades; and wherein the female contact of each female power terminal comprises an S-shape that provides a pair of blade seats, wherein each female contact has a respective blade seat for each contact blade of a respective pair of contact blades.

3. The connection system of claim 2, wherein said male connector comprises: a male connector base carrying said at least one male power terminal cavity, each male power terminal cavity having a barbed locking tab for retaining a respective male power terminal therewithin; and a male connector cover snappably engageable with said male connector base; and wherein said female connector comprises: a female connector base carrying said at least one female power terminal cavity, each female power terminal cavity having an abutment for retaining a respective female power terminal therewithin; and a female connector cover snappably engageable with said female connector base.

4. The connection system of claim 3, further comprising a cover seal, wherein said cover seal is configured to receive said female connector so that said forward end of said female connector remains open, said cover seal having seal means for sealing with respect to any electrical wiring emanating from said female connector.

5. The connection system of claim 4, further comprising a conductive shroud, wherein said conductive shroud is configured to receive said cover seal so that said forward end of said female connector remains open.

6. The connection system of claim 5, further comprising mechanical assist mechanism means connected with said male connector and said shroud for providing a mechanical assist to mating said male connector with respect to said female connector.

7. The connection system of claim 6, wherein said mechanical assist mechanism means comprises:

a pair of lock arms projecting from said forward end of said male connector, each lock arm having a boss;

a pivot connected on each side of said shroud; and a lever pivotally mounted to each said pivot, said lever having a pair of eccentric slots which are eccentric relative to said pivots;

wherein each boss is slidably engaged with a respective eccentric slot as said male and female connectors are about to be mated, and wherein rotation of said lever relative to said shroud causes said forward end of said male connector to mate with said forward end of said female connector.

8. The connection system of claim 7, further comprising a panel mount having an inside side, an opposite outside side, a central opening for receiving said forward end of said male connector, and a pair of arm openings for receiving therethrough said pair of lock arms; and flexible finger means connected with said pair of lock arms for engaging said outside side of said panel mount to thereby secure said male connector to said inside side of said panel mount.

9. The connection system of claim 8, wherein said panel mount has a lip; said cover seal sealing with respect to said panel mount when said male connector is mated to said female connector; said connection system further comprising a conductive seal ring located between said shroud and said lip for providing electrical conduction and sealing therebetween.

10. A high power connection system comprising:
- at least one male power terminal comprising a pair of contact blades and means for connecting a power cable thereto;
- a male connector having a forward end, said male connector having at least one male power terminal cavity for receiving therein a respective male power terminal, wherein the at least one contact blade of the received male power terminal projects from said forward end of the male connector;
- at least one female power terminal comprising an S-shape female contact providing a pair of blade seats, wherein each blade seat for contactably receives a respective contact blade of a pair of contact blades of a respective male power terminal, and further comprising means for connecting a power cable thereto;
- a female connector having a forward end, a nose frame being located at said forward end, said nose frame having a plurality of blade slots and a plurality of alignment slots, said female connector having at least one female power terminal cavity for receiving therein a respective female power terminal, wherein the female contact of the received female power terminal is located adjacent said forward end of said female connector, wherein said forward ends of said male and female connectors are configured to mutually mate such that each contact blade of each male power terminal passes through a respective blade slot and seats into a respective blade seat of a respective female power terminal;
- alignment tab means connected with said forward end of said male connector for alignably and indexably interfacing with the alignment slots of said nose frame when said male and female connectors are mutually mated.

11. The connection system of claim 10, further comprising safety terminal means located in each of said male and female connectors for providing an advance indication of a loss of electrical contact between said at least one male and female power terminals in response to said forward end of said male connector being separated a preselected distance from said forward end of said female connector.

12. A high power connection system comprising:
- at least one male power terminal comprising at least one contact blade and means for connecting a power cable thereto;
- a male connector having a forward end, said male connector having at least one male power terminal cavity for receiving therein a respective male power terminal, wherein the at least one contact blade of the received male power terminal projects from said forward end of the male connector;
- at least one female power terminal comprising a female contact having at least one blade seat for contactably receiving at least one contact blade of a respective male power terminal, and further comprising means for connecting a power cable thereto;
- a female connector having a forward end, a nose frame being located at said forward end, said nose frame having a plurality of blade slots and a plurality of alignment slots, said female connector having at least one female power terminal cavity for receiving therein a respective female power terminal, wherein the female contact of the received female power terminal is located adjacent said forward end of said female connector, wherein said forward ends of said male and female connectors are configured to mutually mate such that the at least one contact blade of each male power terminal passes through a respective blade slot and seats into a respective blade seat of a respective female power terminal;
- alignment tab means connected with said forward end of said male connector for alignably and indexably interfacing with the alignment slots of said nose frame when said male and female connectors are mutually mated;
- a cover seal configured to receive said female connector so that said forward end of said female connector remains open, said cover seal having seal means for sealing with respect to any electrical wiring emanating from said female connector;
- a conductive shroud, wherein said conductive shroud is configured to receive said cover seal so that said forward end of said female connector remains open; and
- mechanical assist mechanism means connected with said male connector and said shroud for providing a mechanical assist to mating said male connector with respect to said female connector.

* * * * *